Oct. 30, 1951 E. E. NOFZINGER 2,573,594
SOLDERING MACHINE
Filed Aug. 21, 1947 7 Sheets-Sheet 1

EARL E. NOFZINGER
INVENTOR.

BY
Richard A. Parsons

Oct. 30, 1951     E. E. NOFZINGER     2,573,594
SOLDERING MACHINE

Filed Aug. 21, 1947     7 Sheets—Sheet 3

EARL E. NOFZINGER
INVENTOR.

BY
Richard A. Parsons

Oct. 30, 1951  E. E. NOFZINGER  2,573,594
SOLDERING MACHINE

Filed Aug. 21, 1947  7 Sheets-Sheet 4

EARL E. NOFZINGER
INVENTOR.

BY

Richard A. Parsons

EARL E. NOFZINGER
INVENTOR.

BY
Richard A. Parsons

Oct. 30, 1951 E. E. NOFZINGER 2,573,594
SOLDERING MACHINE
Filed Aug. 21, 1947 7 Sheets-Sheet 6
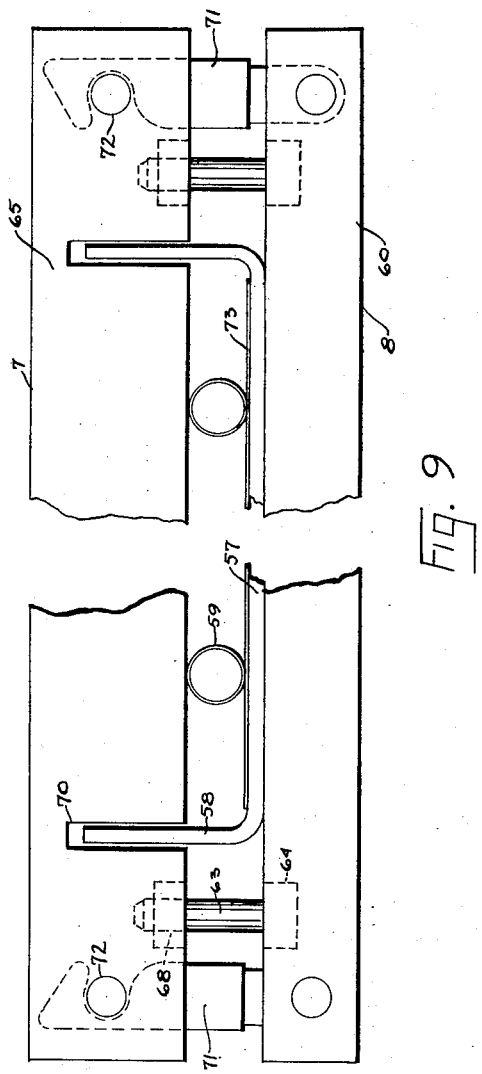
EARL E. NOFZINGER
INVENTOR.
BY
Richard A. Parsons Oct. 30, 1951      E. E. NOFZINGER      2,573,594
SOLDERING MACHINE Filed Aug. 21, 1947      7 Sheets-Sheet 7

EARL E. NOFZINGER
        INVENTOR.

BY
*Richard A. Parsons*

Patented Oct. 30, 1951

2,573,594

UNITED STATES PATENT OFFICE 2,573,594

SOLDERING MACHINE

Earl E. Nofzinger, Greenville, Mich., assignor to Gibson Refrigerator Company, Greenville, Mich., a corporation of Michigan Application August 21, 1947, Serial No. 769,895

3 Claims. (Cl. 113—59)

1

This invention relates to machines for soldering two or more metal parts together.

The principal object of the present invention is to provide a machine which will rapidly solder two metal parts together.

Another object of the invention is to provide such a machine which will securely hold the parts to be soldered in proper relationship during the soldering process.

A still further object of the invention is to provide such a machine which is extremely economical to operate.

These objects will more fully appear in the following specification, when read in connection with the accompanying drawings, wherein:

Figure 9 is a fragmentary side elevational view of the two clamping members with the parts to be soldered together located between the clamping members;

Figure 1:
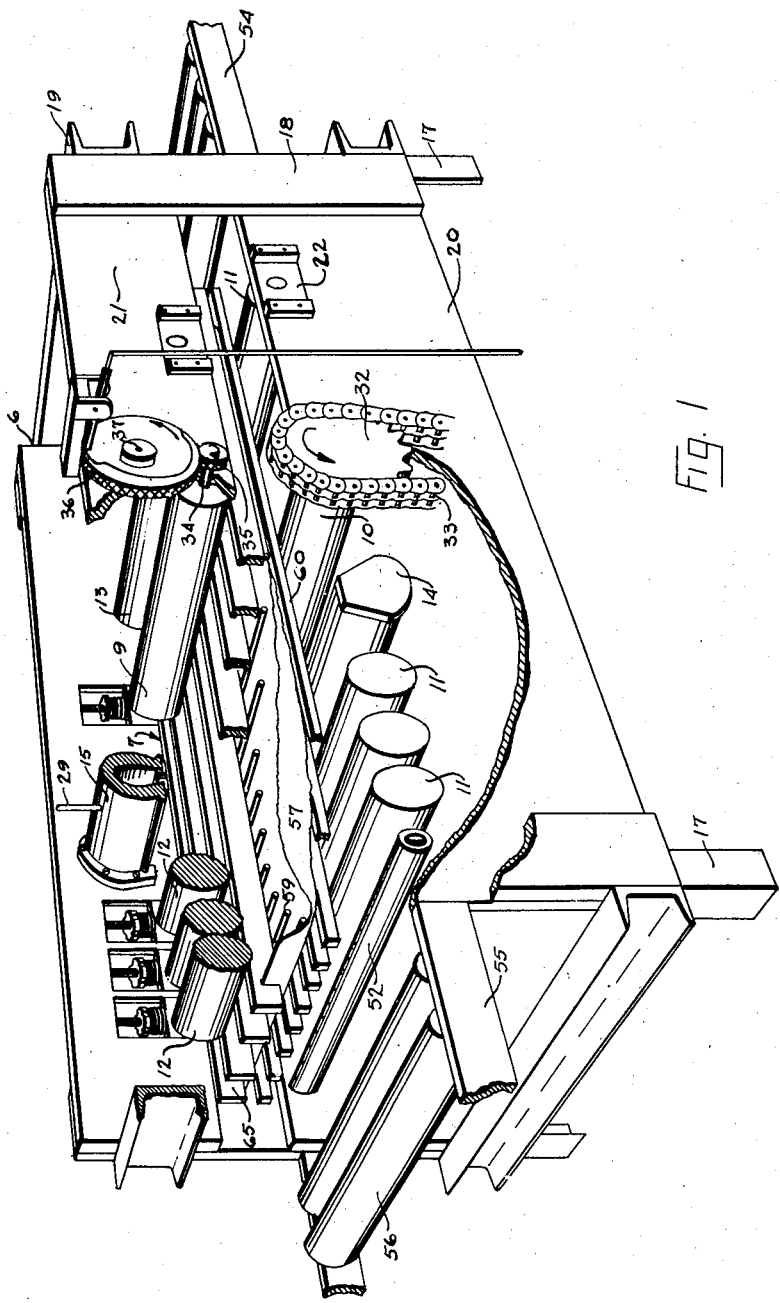
Figure 1 is a fragmentary perspective view of the machine, parts being broken away to more clearly show the construction thereof.

In a general way the invention comprises a frame 6, a plurality of lower horizontal rolls 10 and 11, a plurality of upper horizontal rolls 9, 12 and 13, lower and upper gas burners 14 and 15, mechanism indicated generally by the numeral 16 for regulating the flow of gas to the gas burner, and a pair of clamping members 7 and 8.

The frame 6 is composed of suitable upright legs 17 at the corners thereof. Attached to the legs 17 on each side of the frame are upright

Figure 2:
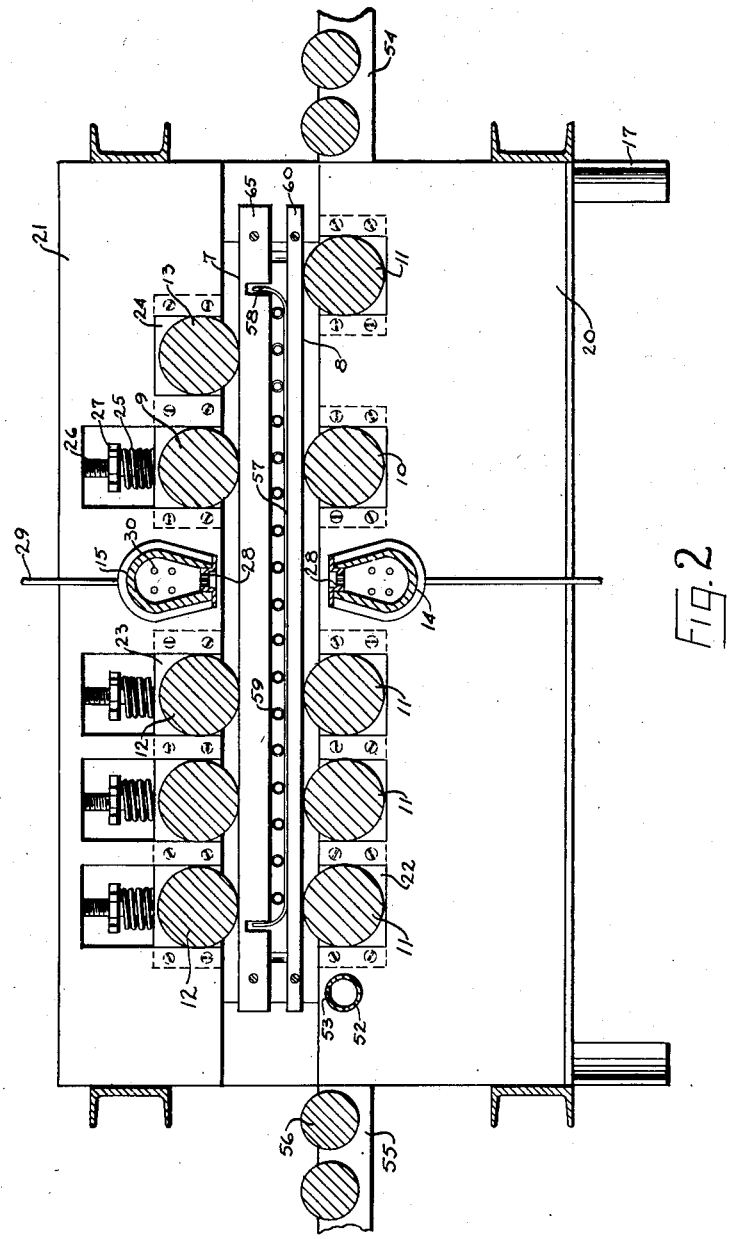
Figure 2 is a fragmentary cross-sectional view of the machine.

2 plates 18. These plates are connected at each end by a pair of horizontal channel members 19 preferably welded thereto. Side plates 20 and 21 connect the plates 18 on each side of the frame. The side plates 20 and 21 are spaced apart vertically from each other, as shown in Figures 1 and 2.

There are four non-driven rolls 11 and one driven roll 10 in the lower tier of rolls. All of the rolls are mounted in suitable bearings 22 on the side plates 20. The axes of the rolls 10 and 11 are in a common horizontal plane.

The rolls 9, 12 and 13 forming the upper tier are mounted on suitable bearings 23 and 24 on the upper side plates 21. The bearings 23 which carry the three rolls 12 and roll 9 are slidable vertically a limited distance and are biased toward their lowermost positions by means of coil springs 25. The coil springs 25 engage the top surfaces of the bearings 23 at the lower ends of the springs. The upper ends of the springs are mounted upon threaded studs 26 attached to the side plates 21. Nuts 27 engage the upper ends of the springs 25 and provide means for adjusting the compression of the springs. Thus, it will be seen that the rolls 9 and 12 are yieldingly mounted in position.

The bearings 24 holding the roll 13 are fixedly mounted in position.

The axes of the rolls 9, 12 and 13 normally are in a common horizontal plane.

Gas burners 14 and 15 extend transversely of the frame 6 between the side plates 20 and 21 respectively. The gas burners 14 and 15 may take any suitable form, but are formed with ports 28 in their adjacent surfaces so that the flames thereof will be directed toward each other. Gas is supplied to both burners through a suitable duct 29 and air for combustion is supplied through openings 30 in the ends of the burners. The gas supply to the burners is regulated by means of a valve 31 which may be a suitable butterfly valve of conventional construction. The means for adjusting the valve to regulate the supply of gas will be described presently.

The lower roll 10 is arranged to be driven in a counter-clockwise direction, as viewed in those figures. To that end the roll is provided with a shaft which extends through the adjacent side plate 20. A sprocket 32 is attached to the end thereof. A chain 33 runs over the sprocket 32 and is connected to any sort of a prime mover, such as an electric motor, not shown.

The roll 9 in the upper tier is located directly above the driven roll. It is provided with a short shaft 34 extending through the adjacent side plate 21. On the end of the shaft 34 is a small pinion 35. The pinion 35 is adapted to mesh with a larger gear 36 rotatably mounted on a shaft 37 on the side plate 21. The pinion 35 meshes with the gear 36 only when the roll 9 is forced upward against the action of springs 25 in the manner to be presently described.

Figure 3:
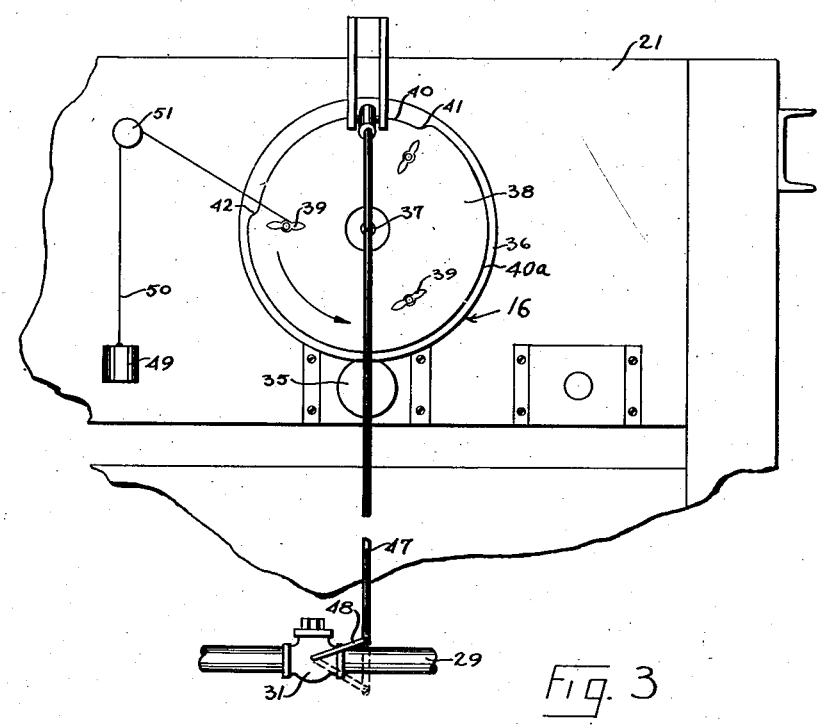
Figure 3 is a fragmentary side elevational view illustrating the mechanism for operating the fuel valve.
Figure 4:
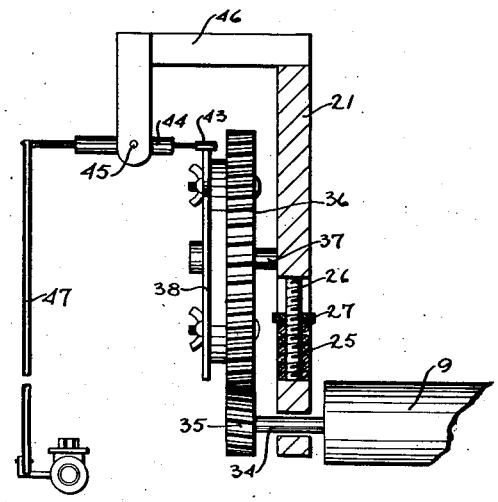
Figure 4 is a fragmentary elevational view of the mechanism shown in Figure 3.

A cam 38 is fixedly attached to the gear 36 by means of wing nuts 39. As will be noted in Figure 3 particularly, the cam 38 has two portions 40 and 40a which are arcs of circles of different diameters. The portion 40a extends through approximately two-thirds of the circumference of the cam. The portion 40 of the cam which constitutes the remainder of the circumference thereof is of smaller diameter than the remainder of the cam. The two portions 40 and 40a are connected by shoulders 41 and 42.

A cam follower in the form of a small roller 43 is mounted on one end of a rocker arm 44. The rocker arm 44 is pivotally connected at 45 to an L-shaped support 46 connected to the side plate 21. The other end of the rocker arm 44 opposite the roller 43 is connected to a link 47 at the upper end of the latter. The lower end of the link is pivotally connected to an arm 48 which regulates the position of the valve. Vertical movement of the link 47 rotates the arm 48 and opens and closes the valve 31.

The cam 38 and gear 36 are normally held in a predetermined position by means of a counterweight 49. Counterweight 49 is hung by means of a cable 50 passing over a pulley 51 on the side plate 21. The other end of the cable is attached to the cam in any suitable manner, such as connecting it to one of the wing nuts 39. The operation of the valve actuating mechanism will be described presently.

In addition to the foregoing, a pipe 52 is mounted on the frame 6 to the left of the lower rolls 11. The pipe 52 is provided with numerous small perforations 53 in the upper portion thereof. The pipe 52 is connected by any suitable conduit, not shown, to a source of water supply under pressure so that water can be sprayed on the parts to be soldered to cool the same after the solder has been fused by the gas burners.

At each end of the frame 6 are conveyors 54 and 55 having rollers 56 rotatably mounted thereon.

Figure 10:
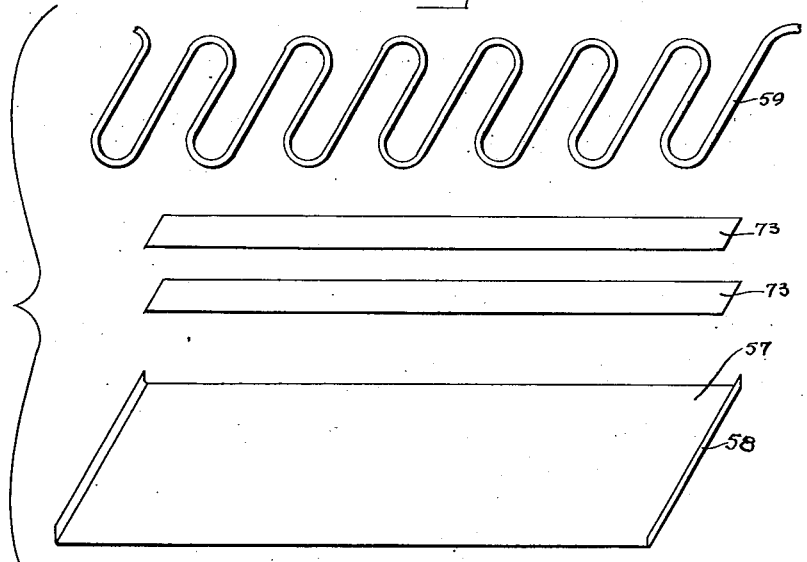
Figure 10 is an exploded pictorial view showing the parts to be soldered together and strips of solder in the relative order in which they are placed together.

The parts to be soldered by the present invention are assembled prior to soldering and in order to hold them in proper relationship while putting them in the machine a pair of clamping members 7 and 8 are provided. In the present instance the clamping members are designed to hold certain parts of an evaporator for a refrigerator. However, the type of structure which they are designed to hold is not material. The evaporator comprises in part an elongated plate 57 having flanges 58 turned up at the ends thereof and a refrigerant conduit 59. The conduit 59 is formed of tubing of small cross-section bent into sinuous form, as shown in Figure 10. It will be noted that the plate 57 is planar, except for the flanges 58. The convolutions of the conduit 59 are in a common plane. Therefore, both parts are substantially planar.

Figure 5:
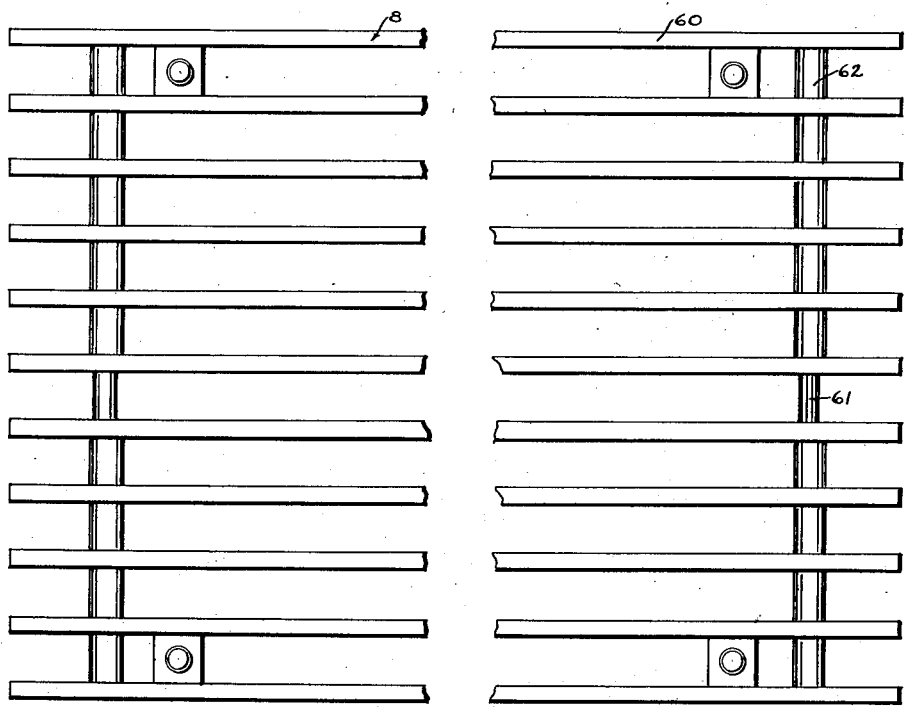
Figure 5 is a fragmentary plan view of the lower clamping member for holding the parts together.
Figure 6:
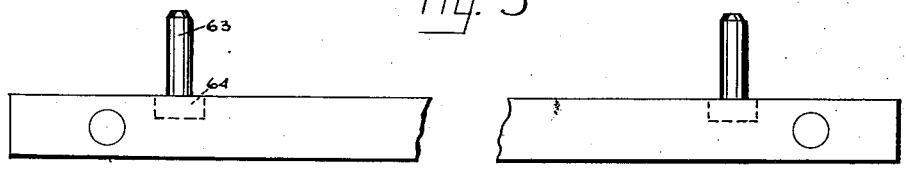
Figure 6 is a fragmentary elevational view of the same.

There are two clamping members 7 and 8. The lower clamping member 8 is shown in Figures 5 and 6. It comprises a grid of iron bars 60 of rectangular cross-section. These bars are connected together by a pair of transverse rods 61 which extend through aligned openings in the bars 60. The bars are spaced apart by short sleeves 62 placed upon the rods 61 during the assembly of the grid. Adjacent the four corners of the grid are locating pins 63. These pins are welded to or made integral with small rectangular blocks 64 welded between the outermost pairs of bars 60.

The upper clamping member 7 is similar to the one previously described. It is composed of a grid of bars 65 of rectangular cross-section held together by rods 66 and spaced apart by sleeves 67. Adjacent the corners of the last mentioned grid are four small blocks 68 having holes 69 therethrough. The holes 69 receive the locating pins 63 on the lower clamping member.

The sizes and spacing of the bars 60 and 65 are such that the open area through the grids is at least 50% of the total overall area of the grids, thereby permitting the heat from the gas burners to be transmitted to the parts to be soldered. Also, the contact area between the grids and the work is relatively small, decreasing the cooling effect of the grids.

Figure 7:
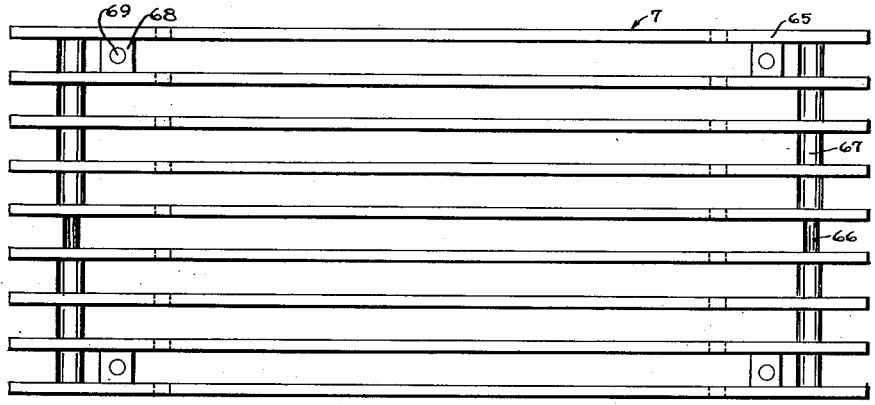
Figure 7 is a plan view of the upper clamping member.
Figure 8:
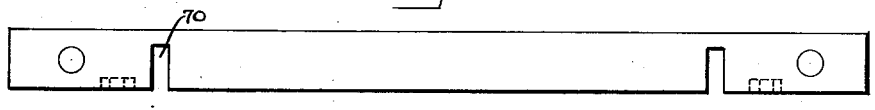
Figure 8 is a side elevational view of the same.

The bars 65 are notched at 70 to receive the flanges 58 on the plate 57, as shown in Figures 7, 8 and 9.

One of the clamping members, preferably the lower clamping member, is provided with hooks 71 at the corners thereof. The hooks are pivotally attached to the outermost bars 65. The upper clamping member is provided with horizontally transversely extending pins 72 over which the hooks 71 are adapted to engage to hold the clamping members together.

It will be noted from the drawings, particularly Figure 9 thereof, that the bars 60 of the lower clamping member 8 are of considerably less vertical extent than the corresponding dimension of the bars 65 in the upper clamping member. It is not essential that there be such a great difference. It is, however, necessary that the lower clamping member 8 be relatively flexible, while the upper clamping member 7 be quite rigid. In order to conserve material, as well as decrease the weight of the clamping members, the two are made of different vertical extents.

One clamping member is rigid, while the other is flexible in order that variation in thickness of the plate 57, as well as slight differences in diameter of the tube 59 at various points, will not cause the tube to be crushed when the assembled clamping members and parts to be soldered are passed between the rolls, as will be more fully pointed out hereinafter.

The parts 57 and 59 are assembled between the clamping members 7 and 8 by first laying the plate 57 on top of the lower clamping member with the flanges extending upwardly. A coating of flux is painted on the upper surface of the plate 57 and one or more strips of solder 73 are laid upon the plate 57. The strips 73 are coated with flux and the evaporator tube 59 is placed upon the strips of solder. The upper clamping member is then placed in position with the notches 70 receiving the flanges 58 and the apertures 69 receiving the locating pin 63. The hooks 71 are then hooked over the pins 72.

In that condition the entire assembly of parts 57 and 59 to be soldered and the clamping members 7 and 8 are placed upon the conveyor 54 and pushed into place between the upper and lower tiers of rolls. The driven roll 10 is constantly rotating and as soon as the front end of the clamping member assembly engages the driven roll it will automatically be fed through the soldering machine. When the clamping member assembly engages the roll 9, two things occur. Horizontal movement of the clamping members 7 and 8 impart to the roll 9 a rotation in a clockwise direction. At the same time the roll 9 is pushed upward causing pinion 35 to mesh with gear 36, which imparts a counter-clockwise rotation to the gear 36 and cam 38. At the time the cam 38 begins to move the cam is approximately in the position shown in Figure 3. The cam follower 43 is in engagement with the portion 40 of the cam. In this position the valve 31 is nearly closed. However, it is open to pilot position, or a position wherein a small flow of gas through the burners is maintained. Continued forward movement of the clamping members and consequent counter-clockwise rotation of the cam 38 causes the shoulder 41 to raise the cam follower 43 and open the valve 31 to its fully opened position. The burners 14 and 15 will then operate at their maximum capacity. The parts are so arranged that the shoulder 41 engages the cam follower and opens the valve at about the time, or just before, the parts to be soldered reach a position between the gas burners. The cam follower then rolls upon the portion 40a of the cam and maintains the valve 31 in its open position until the clamping members have passed beyond the driven roll. At that time the parts 57 and 58 have reached a point between the burners and are heated thereby. As soon as the clamping members pass beyond the driven roll 10, the roll 9 immediately thereabove becomes disengaged from the upper clamping member, the springs 25 push the roll 9 down and permit the pinion 35 to disengage from the gear 36. The counter weight 49 immediately returns the cam to its position of rest and permits the valve 31 to close to its pilot position.

During all of this movement of the clamping members a continuous stream of cooling fluid is being sprayed from the pipe 52 against the clamping members and the parts to be soldered, thereby solidifying the solder and cooling the clamping members to a point where they can be comfortably handled. Also, when the clamping members have passed the driven roll, at least the forward end of this assembly has passed outwardly onto a conveyor 56 where it can be grasped and pulled from the machine. The hooks 71 are disengaged from the pins 72, the clamping members disassembled and the soldered parts removed therefrom.

In the meantime another assembly can have been started through the machine.

Figure 11:
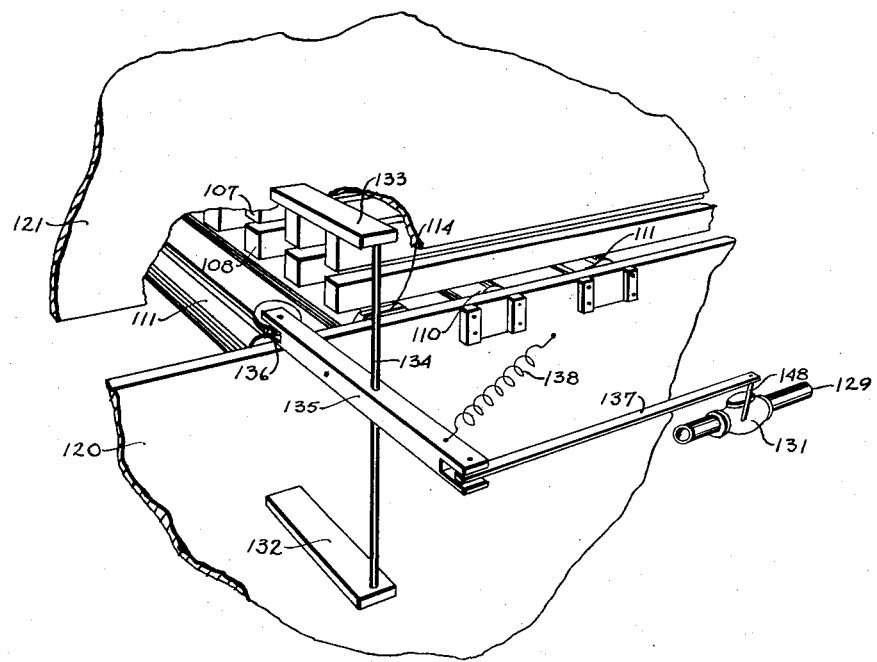
Figure 11 is a fragmentary perspective view showing a modified form of gas valve actuating mechanism.

Figure 11 illustrates another form of mechanism for actuating the gas regulating valve. The frame, rolls, clamping members may be identical with those previously described, but the mechanism for actuating the gas regulating valve is operated by contact with the clamping assembly, rather than from one of the rolls.

The frame includes side plates 120 and 121 similar to plates 20 and 21 previously described. The lower side plate 120 carries a plurality of rolls 110 and 111, while the upper side plate 121 carries other rolls, not shown.

Two supports, 132 and 133, are attached to side plates 120 and 121, respectively, and extend laterally outwardly therefrom. A pivot rod 134 is mounted on the supports 132 and 133 and carries a lever 135 pivotally mounted thereon. On one end of the lever 135 is a rotatable roller 136. The other end of the lever 135 is connected by a link 137 to arm 148 on valve 131. A coil spring 138 tends to hold the lever in a position perpendicular to the side plates 120 and 121, in which position the valve 131 is closed to pilot position.

The arm 135 is so proportioned that when in the position shown in Figure 11, the roller 136 lies in the path of one of the clamping members 107 or 108; in the present instance, in the path of the latter.

When the leading end of the assembly including the clamping members reaches a position between the gas burners, the clamping member 108 strikes roller 136. Continued movement of the clamping member rotates the lever 135 counter-clockwise (as viewed in Figure 11) opening gas valve 131 and increasing the flame from the gas burners. After the clamping member 108 has passed by the roller 136, spring 138 pulls the lever 135 back to its original position, and closes the gas valve.

The operation of the machine, other than that just described, is the same as previously described.

From the foregoing it will be apparent that the present invention provides an efficient semi-automatic means for soldering two parts together. The pressure of the rolls maintains the parts to be soldered in tight engagement with each other during the soldering process. Also, the engagement of parts is such that the gas burners are not operating except during the time when the heat is actually needed to melt the solder.

The scope of the invention is indicated in the appended claims.

I claim:

1. A soldering machine for soldering two parts together which comprises a roll support, upper and lower spaced apart sets of parallel rolls on said support, said sets of rolls forming a passageway between them having an inlet end and an exit end, one roll adjacent the inlet end being movable and biased toward the opposite set of rolls, a heat applicator mounted on said support adjacent said one roll for applying heat to said parts during a portion of the travel of the latter between said sets of rolls, said heat applicator being provided with means for regulating the heat supply thereby, said means including a cam and cam follower and driving means on said one roll normally spaced from but engageable with said cam when said one roll is moved a predetermined distance from the opposite set of rolls.

2. A soldering machine for soldering two parts together which comprises a roll support, upper and lower spaced apart sets of parallel rolls on said support, said sets of rolls forming a passageway between them having an inlet end and an exit end, one roll adjacent the inlet end being movable and biased toward the opposite set of rolls, a gas burner on said support adjacent said one roll, means including a gas regulating valve for supplying gas to the burner in regulatable quantities, and means connected to said valve for actuating the latter to vary the flow of gas during the predetermined rotation of said one roll, said means including a cam and cam follower and driving means on said one roll normally spaced from but engageable with said cam when said one roll is moved a predetermined distance from the opposite set of rolls.

3. A soldering machine for soldering two parts together which comprises a roll support, upper and lower spaced apart sets of parallel rolls on said support, said sets forming a passageway between them having an inlet end and an exit end, one roll adjacent the inlet end being movable and resiliently biased toward the opposite set of rolls, a carrier for the parts to be soldered adapted to be moved between said sets of rolls in contact therewith and to rotate said one roll when in contact therewith, driving means for rotating another of said rolls, a gas burner on said support adjacent said one roll, means including a gas regulating valve for supplying gas to the burner in regulatable quantities, and means connected to said valve for actuating the latter to vary the flow of gas during a predetermind rotation of said one roll, said means including a cam and cam follower and driving means on said one roll normally spaced from but engageable with said cam when said one roll is engaged by said carrier.

EARL E. NOFZINGER.

REFERENCES CITED

The following references are of record in the file of this patent:

UNITED STATES PATENTS

| Number | Name | Date |
| --- | --- | --- |
| 941,147 | Holloway | Nov. 23, 1909 |
| 995,589 | Eichmann | June 20, 1911 |
| 1,096,512 | Lindhe | May 12, 1914 |
| 1,367,018 | Coffelder | Feb. 1, 1921 |
| 1,660,576 | Owston | Feb. 28, 1928 |
| 1,831,343 | Caldwell | Nov. 10, 1931 |
| 2,021,893 | Mitchell | Nov. 26, 1935 |
| 2,076,207 | Powell | Apr. 6, 1937 |
| 2,083,921 | Roberts | June 15, 1937 |
| 2,101,929 | Boerger | Dec. 14, 1937 |
| 2,189,540 | Boerger | Feb. 6, 1940 |